M. HOUGHTON.
MILK RECEPTACLE AND CREAM REMOVER.
APPLICATION FILED MAR. 6, 1920.
1,364,763.
Patented Jan. 4, 1921.
2 SHEETS—SHEET 1.
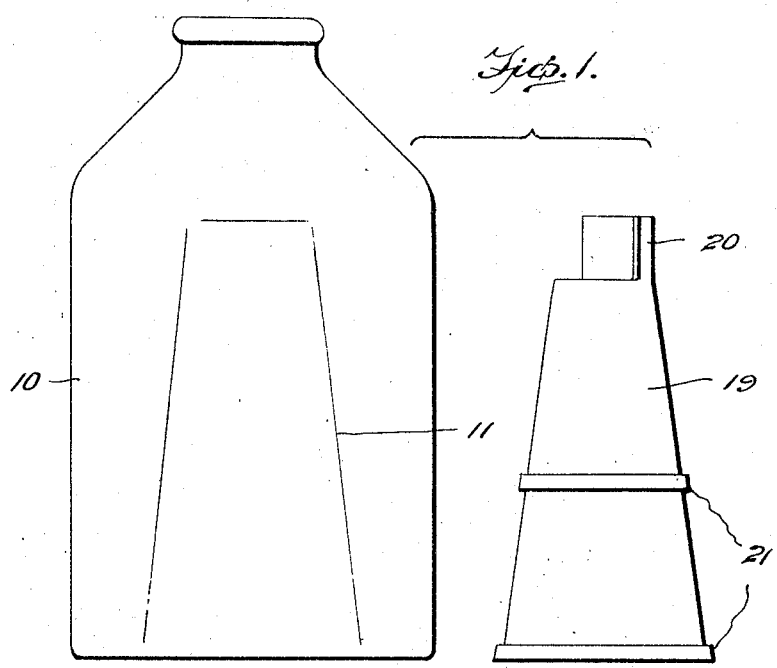
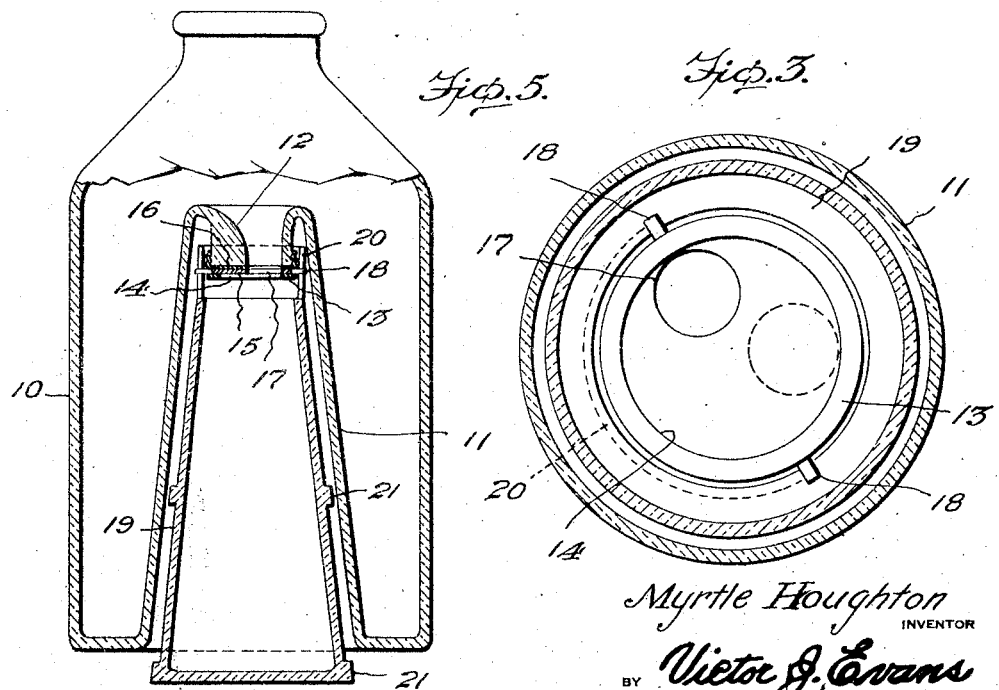
Myrtle Houghton
INVENTOR
BY Victor J. Evans
ATTORNEY

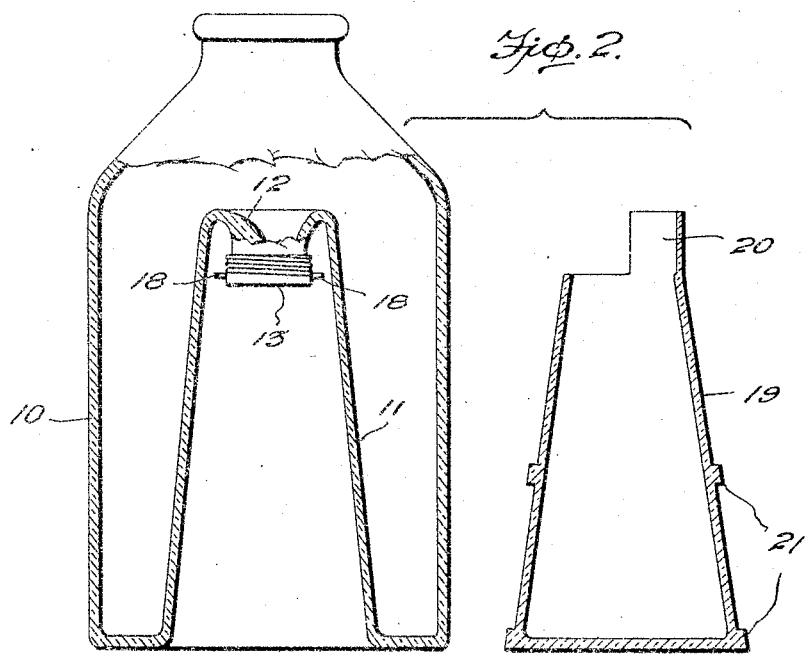
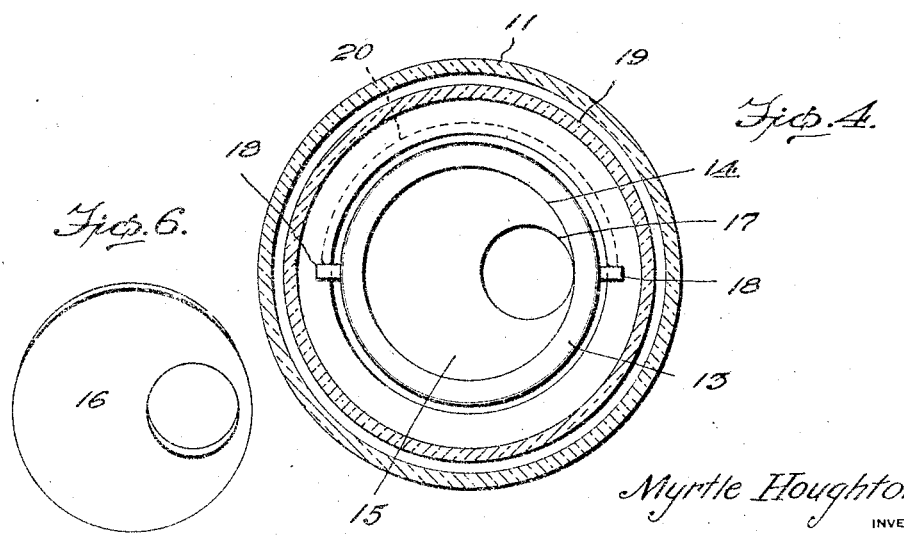

UNITED STATES PATENT OFFICE.

MYRTLE HOUGHTON, OF THOMSON, ILLINOIS.

MILK-RECEPTACLE AND CREAM-REMOVER.

1,364,763.	Specification of Letters Patent.	Patented Jan. 4, 1921.

Application filed March 6, 1920. Serial No. 363,892.

*To all whom it may concern:*

Be it known that I, MYRTLE HOUGHTON, a citizen of the United States, residing at Thomson, in the county of Carroll and State of Illinois, have invented new and useful Improvements in Milk-Receptacles and Cream-Removers, of which the following is a specification.

This invention relates to receptacles for milk and has for its object the provision of a receptacle with which is associated means whereby the cream rising to the top of the milk may be quickly and easily removed without disturbing the milk itself.

An important and more specific object is the provision of a device of this character including a specially formed receptacle for milk and a separate receptacle adapted to be inserted into the bottom of the milk receptacle to receive the cream.

With the above and other objects and advantages in view, the invention consists in the details of construction to be hereinafter more fully described and claimed, and illustrated in the accompanying drawings in which—

Figure 1 is a side elevation showing the two parts of my device separated,

Fig. 2 is a longitudinal sectional view showing the parts separated,

Figs. 3 and 4 are detail cross sectional views taken through the milk receptacle and showing different positions of the closure cap therein, Fig. 5 is a longitudinal sectional view through the milk receptacle showing the cream receiver engaged therein, and Fig. 6 is a detail view of a disk to be placed within the cap.

Referring more particularly to the drawings, the numeral 10 designates my improved milk receptacle which may be of conventional shape and of any desired capacity and formed preferably, though not necessarily, of glass. Formed integrally with the milk receptacle and extending upwardly therein, from the bottom and in spaced relation to the sides, is a funnel-shaped projection 11 which is hollow and which has its lower end opening through the bottom of the receptacle 10, as shown. One side wall of this projection 11 is thickened preferably, as shown at 12. The projection 11 is formed of such length that its upper end will be disposed at the line of demarcation between the milk and cream in the receptacle. Screwed upon the top of this projection 11 is a cap 13 provided with a hole 14 and revoluble within this cap is a disk 15 having associated therewith a suitable packing gasket 16. The disk 15 is provided with a hole 17 and is rotatable whereby to bring the hole 17 into registration with the hole 14, when desired. The disk has formed upon its underside, or secured thereto, a pair of ears 18. In conjunction with the receptacle 10 I make use of a cream receiver 19 formed as a tapered hollow body having an open top end and provided with a lip 20. This member 19 has formed thereon circumferential ribs 21 whereby to provide a grip for the operator's fingers.

The operation of the device is as follows:

Milk is poured into the receptacle through the top thereof in the ordinary manner after which the top may be closed as by means of the usual card-board stopper employed by dairymen. When the receptacle is filled it is of course apparent that the disk 15 must be in such position that the holes 14 and 17 will be out of registration so as to prevent the milk from running out. When the cream has risen to the top and it is desired to remove the same, the operator places the cream receiver 19 within the hollow projection 11 in the receptacle 10 with the lip 20 engaging between the lugs or ears 18 on the disk 15. The operator then turns the receiver 19 whereupon the disk 15 will be partially rotated and the holes 17 and 14 brought into registration. The cream will then pass into the open upper end of the projection 11 and pass through the registering holes 17 and 14 into the receiver 19 which is then of course removed. The lip 20 on the receiver also forms a discharge spout to facilitate pouring out the cream therein.

From the foregoing description and a study of the drawings it will be apparent that I have thus provided a simple and yet highly efficient device by means of which cream rising from milk may be quickly and easily removed without danger of spilling.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. In combination, a receptacle adapted to contain milk and having therein an upwardly extending hollow projection formed integrally upon and rising from the bottom thereof and terminating at the line of demarcation between milk and cream within the receptacle, means closing the open upper end of said projection; and a cream receiver formed as a hollow body having an open top and insertible within said projection, and means operable by rotary movement of said receiver whereby to open the closure means at the top of the projection.

2. In combination, a receptacle adapted to contain milk and having formed therein a hollow projection rising from the bottom in spaced relation to the walls and having an open upper end terminating at the line of demarcation between milk and cream within the receptacle, the bottom of said projection opening through the bottom of the receptacle, a cap closing the open upper end of the projection, a disk rotatably mounted within said cap and provided with a hole, said cap being provided with a hole; and a cream receiver formed as a hollow receptacle having an open upper end insertible within said projection, and means operable by movement of said receiver within the projection whereby to rotate said disk to bring said holes in registration.

3. In combination, a receptacle adapted to contain milk and having formed therein a hollow projection rising from the bottom in spaced relation to the walls and having an open upper end terminating at the line of demarcation between milk and cream within the receptacle, the bottom of said projection opening through the bottom of the receptacle, a cap closing the open upper end of the projection, a disk rotatably mounted within said cap and provided with a hole, said cap being provided with a hole; and a milk receiver formed as a hollow receptacle having an open upper end insertible within said projection, and means operable by movement of said receiver within the projection whereby to rotate said disk to bring said holes in registration, said means comprising spaced lugs on said disk, and a lip formed on the upper end of the receiver and engageable with said lugs.

In testimony whereof I affix my signature.

MYRTLE HOUGHTON.